*Stocking & Shaffer.*
*Steam Balanced Valve.*
Nº 76,545. Patented Apr. 7, 1868

Witnesses:
Wm. S. Leyhborough.
Jas. C. Campbell.

Inventor:
Jerome Stocking
Edward P. Shaffer.

United States Patent Office.

JEROME STOCKING AND EDWARD P. SHAFFER, OF ROCHESTER, NEW YORK.

Letters Patent No. 76,545, dated April 7, 1868.

IMPROVEMENT IN STEAM-ENGINE SLIDE-VALVES.

*The Schedule referred to in these Letters Patent and making part of the same.*

TO ALL WHOM IT MAY CONCERN:

Be it known that we, JEROME STOCKING and EDWARD P. SHAFFER, of Rochester, in the county of Monroe, and State of New York, have invented certain new and useful "Improvements in Slide-Valves for Steam-Engines;" and we do hereby declare that the following is a full, clear, and exact description thereof, reference being had to the accompanying drawings, making part of this specification, in which—

Like letters indicate corresponding parts in both figures.

This invention will be better understood by reference to the drawings and specification.

We provide each valve proper with two sets of ports, B and B', for the live, and two, C, for the exhaust steam. The base-plate of the steam-chest is provided with two elevated port-chambers, D, the adjacent sides of which are cast and planed exactly parallel to each other. These faces constitute the valve-seats, each valve having two seats, and the steam-ports $b$, $d$, and $f$, are cut through them.

Figure 1:
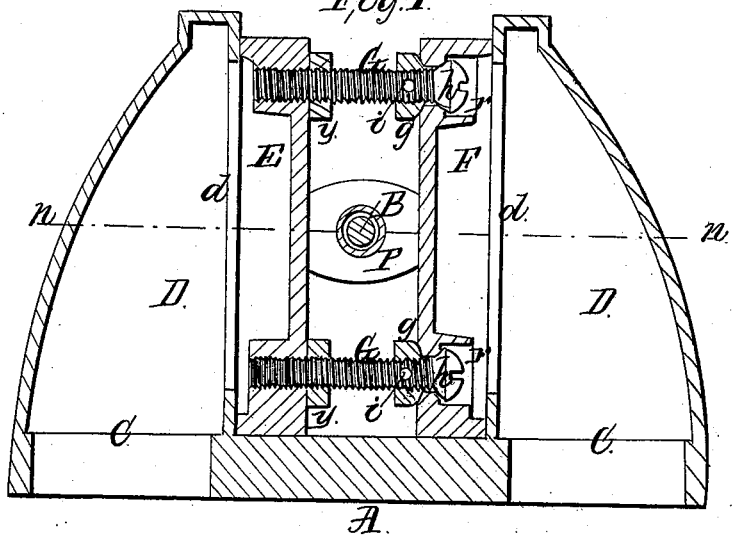
Figure 1 is a vertical section of our invention, taken in the direction of the red line $o$ in fig. 2.
Figure 2:
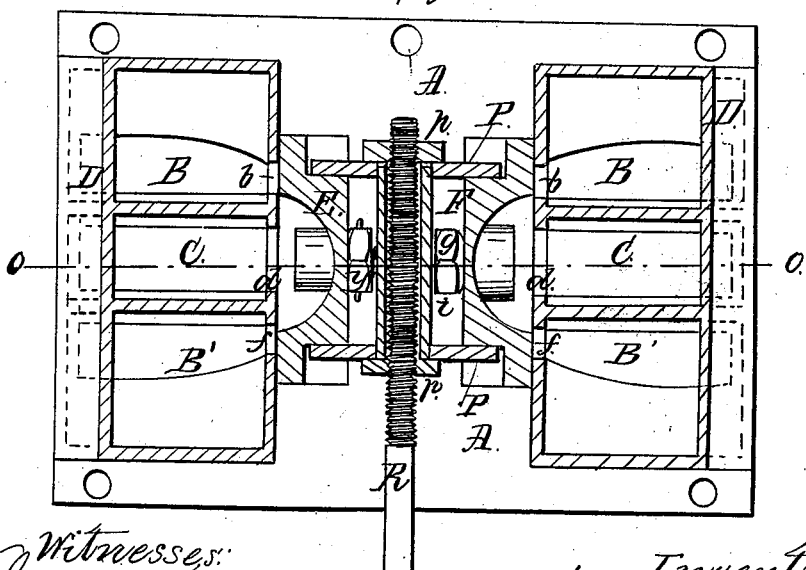
Figure 2 is a horizontal sectional view, taken in the plane of the red line $n$ in fig. 1.

The valve is composed of two cut-off plates, E and F, constructed as shown in the drawings. They are connected together by means of two adjusting-screws, G, the heads of which are made with a spherical shoulder, as shown at $h$, fig. 1. The plate F is cast with recesses, $r$, in the inside, to receive the screw-heads $h$, and the opposite or outside is slightly recessed, to receive the spherical face of the set-nuts $g$. The screws are tapped through the opposite plate, E, as shown. By making the valve or cut-off plates separate, and connecting them by set-screws, they may be perfectly adjusted to fit the space between the two elevated seat or port-chambers D. The spread of the valve is set or regulated by inserting the screws G in the plate F, and turning the nuts $g$ firmly against it. The screws are then turned into the opposite plate, E, until the valve will just move freely between the seats, and the set or jam-nuts $y$ are turned firmly against the plate E, after which the nuts $g$ are turned back slightly, so as to leave the plate F loose upon the screws, and yet the spread of the plates is rigidly limited. The nuts $g$ are fixed in this adjustment by the pins $i$.

It will be seen that by this means the valve may be spread at any time, so as to compensate for any wear that might, by any possibility, occur between the valve and seats, and the plates E and F are held rigidly from being spread or separated, by the pressure of the steam against the seats, and at the same time may approach each other, as forced by any extra contraction of the seat-bed.

The valve-rod R is connected to the valve by suitable collar-plates, P, which are allowed to slide vertically upon the valve, and thereby permit the self-lining of the valve-rod through the stuffing-box of the steam-chest. The valve is set upon the rod by the nuts $p$, in the usual manner. The ports B both lead into one end of the cylinder, and B' into the other. The exhaust-ports C both communicate in one discharge-pipe. The wear caused by the gravity of the valve comes upon the plain surface of the bed A, and when it is "running empty" it moves loosely between the seats. A rigid or solid double valve may be used, if desired, by substituting a new one occasionally, in case it should become worn at all, so as to be leaky.

We do not claim slide-valves having two parallel seats and adjustable faces, as shown in the patent of David Pyke, April 2, 1867, but What we do claim as our invention, and desire to secure by Letters Patent, is—

The combination of the fixed nut $g$, screw-head $h$, with the double-seated valves E and F, whereby the seats of the valves are allowed to work freely, irrespective of expansion and contraction of the steam-chest, substantially upon the principle as herein set forth.

JEROME STOCKING,
EDWARD P. SHAFFER.

Witnesses:
WM. S. LOUGHBOROUGH,
JAMES C. CAMPBELL.